(12) United States Patent
Smith

(10) Patent No.: US 7,963,064 B2
(45) Date of Patent: Jun. 21, 2011

(54) ASSEMBLY AND METHOD FOR MOVING DECOYS

(76) Inventor: Charles Smith, Poplar Bluff, MO (US)

( * ) Notice: Subject to any disclaimer, the term of this patent is extended or adjusted under 35 U.S.C. 154(b) by 464 days.

(21) Appl. No.: 12/210,788

(22) Filed: Sep. 15, 2008

(65) Prior Publication Data

US 2009/0094877 A1   Apr. 16, 2009

Related U.S. Application Data

(60) Provisional application No. 60/993,925, filed on Sep. 14, 2007.

(51) Int. Cl.
  *A01M 31/06* (2006.01)
(52) U.S. Cl. ................................. 43/3; 43/2
(58) Field of Classification Search ............... 43/3, 2
  See application file for complete search history.

(56) References Cited

U.S. PATENT DOCUMENTS

| | | | | |
|---|---|---|---|---|
| 2,624,144 A | * | 1/1953 | Beverman | 43/3 |
| 4,535,560 A | * | 8/1985 | O'Neil | 43/3 |
| 5,074,071 A | * | 12/1991 | Dunne | 43/3 |
| 5,566,491 A | * | 10/1996 | Phillips | 43/3 |
| 5,974,720 A | * | 11/1999 | Bowling | 43/3 |
| 6,138,396 A | * | 10/2000 | Capps | 43/3 |
| 6,374,529 B1 | * | 4/2002 | Petroski et al. | 43/3 |
| 6,845,586 B1 | * | 1/2005 | Brock, IV | 43/3 |
| 7,788,840 B2 | * | 9/2010 | Wyant et al. | 43/3 |
| 2002/0124453 A1 | * | 9/2002 | Payne | 43/3 |
| 2009/0084018 A1 | * | 4/2009 | Elliott et al. | 43/3 |

* cited by examiner

*Primary Examiner* — Christopher P Ellis
(74) *Attorney, Agent, or Firm* — Shook Hardy & Bacon, LLP

(57) ABSTRACT

An assembly and method for moving decoys is disclosed. The assembly includes one or more components for horizontally moving decoys floating on water, such that the decoys appear to be swimming. In addition, the device includes one or more component for rotating decoys, such that the decoys appear to be changing direction while swimming. For example, the assembly may include at least two posts connected by one or more slide rails. Each post includes a rotation initiation bar and a series of timing pins to engage a decoy carrier, which slides between the posts along the one or more slide rails. The decoy carrier is connected to pull lines, which are wound about a rotatable reel or spool.

16 Claims, 3 Drawing Sheets

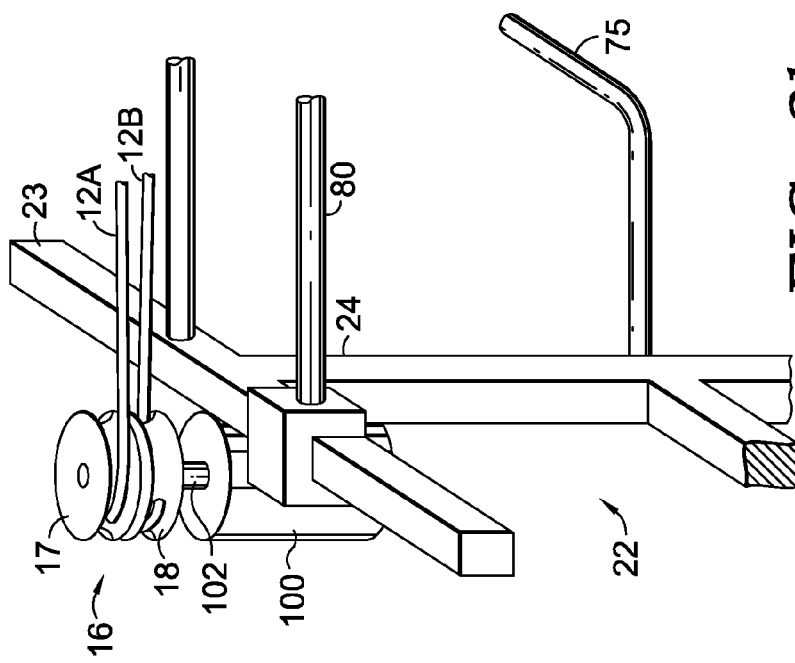
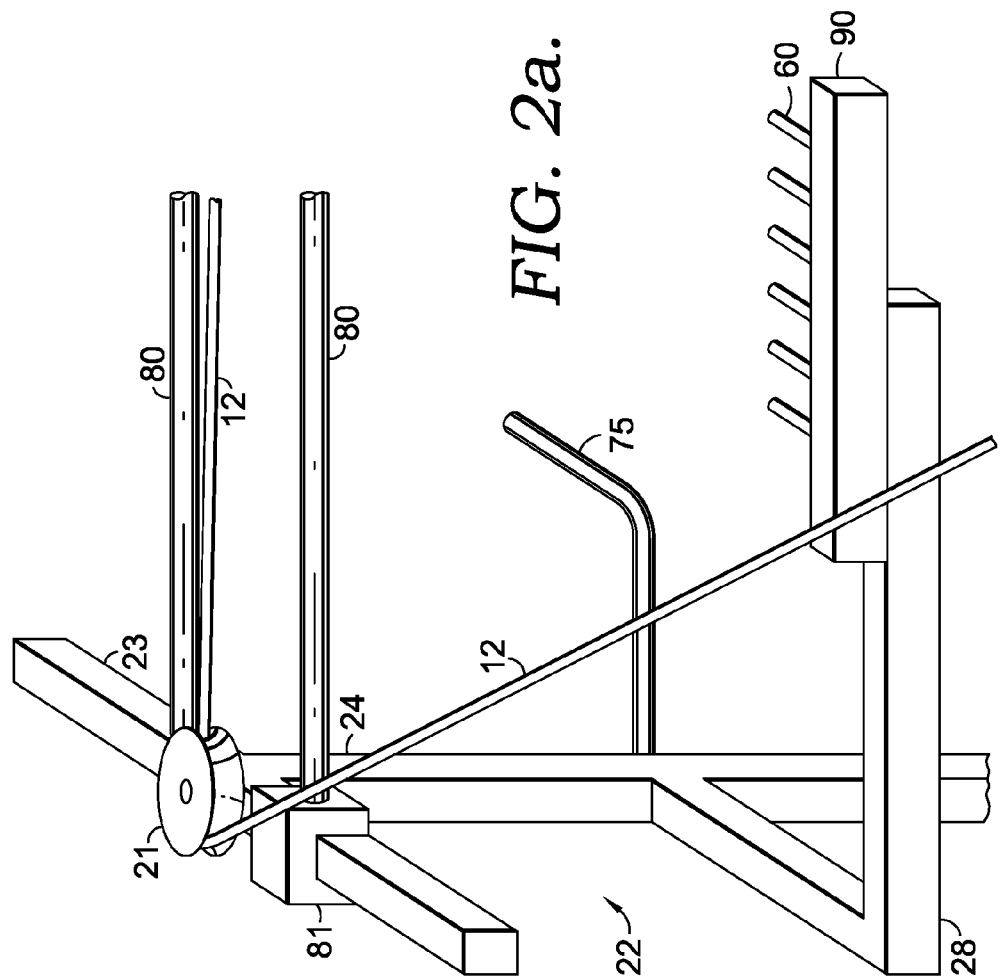

US 7,963,064 B2

ASSEMBLY AND METHOD FOR MOVING DECOYS

CROSS-REFERENCE TO RELATED APPLICATIONS

This application claims, pursuant to 35 U.S.C. §119(e), the benefits of U.S. provisional patent application No. 60/993,925, filed on Sep. 14, 2007.

STATEMENT REGARDING FEDERALLY SPONSORED RESEARCH OR DEVELOPMENT

Not applicable.

TECHNICAL FIELD

The present invention relates to an assembly for moving decoys to attract animals. More specifically, the present invention discloses an assembly for moving duck decoys.

BACKGROUND OF THE INVENTION

For a variety of reasons, such as hunting, photography, and animal watching, it is desirable to attract animals to a specific location. One well known method to attract animals involves displaying decoys in a static arrangement. Other methods include displaying decoys in motion.

BRIEF SUMMARY OF THE INVENTION

The present invention generally relates to an assembly for moving duck decoys in water. The assembly includes one or more components for horizontally moving decoys floating on water, such that the decoys appear to be swimming. In addition, the device includes one or more components for rotating decoys, such that the decoys appear to be changing direction while swimming.

In one embodiment, the assembly includes at least two posts securable into the bed or floor of a body of water. The two posts are connected by one or more slide rails. Each post includes a rotation initiation bar and a series of timing pins, which extend near perpendicular from the respective post and beneath the one or more slide rails. The rotation initiation bar and timing pins engage a decoy carrier, which slides between the posts along the one or more slide rails. The decoy carrier is connected to pull lines, which are wound about a rotatable reel or spool.

The present invention possesses several advantages and accomplishes various objectives. For example, the present invention produces the appearance of a swimming pattern for decoys attached to the invention.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein:

FIG. 2a is a perspective view of a top portion of a post in an embodiment of the invention;

FIG. 2b is a view similar to 2a illustrating an alternative embodiment in which a rotatable reel is coupled to a motor.

DETAILED DESCRIPTION OF THE INVENTION

Figure 1:
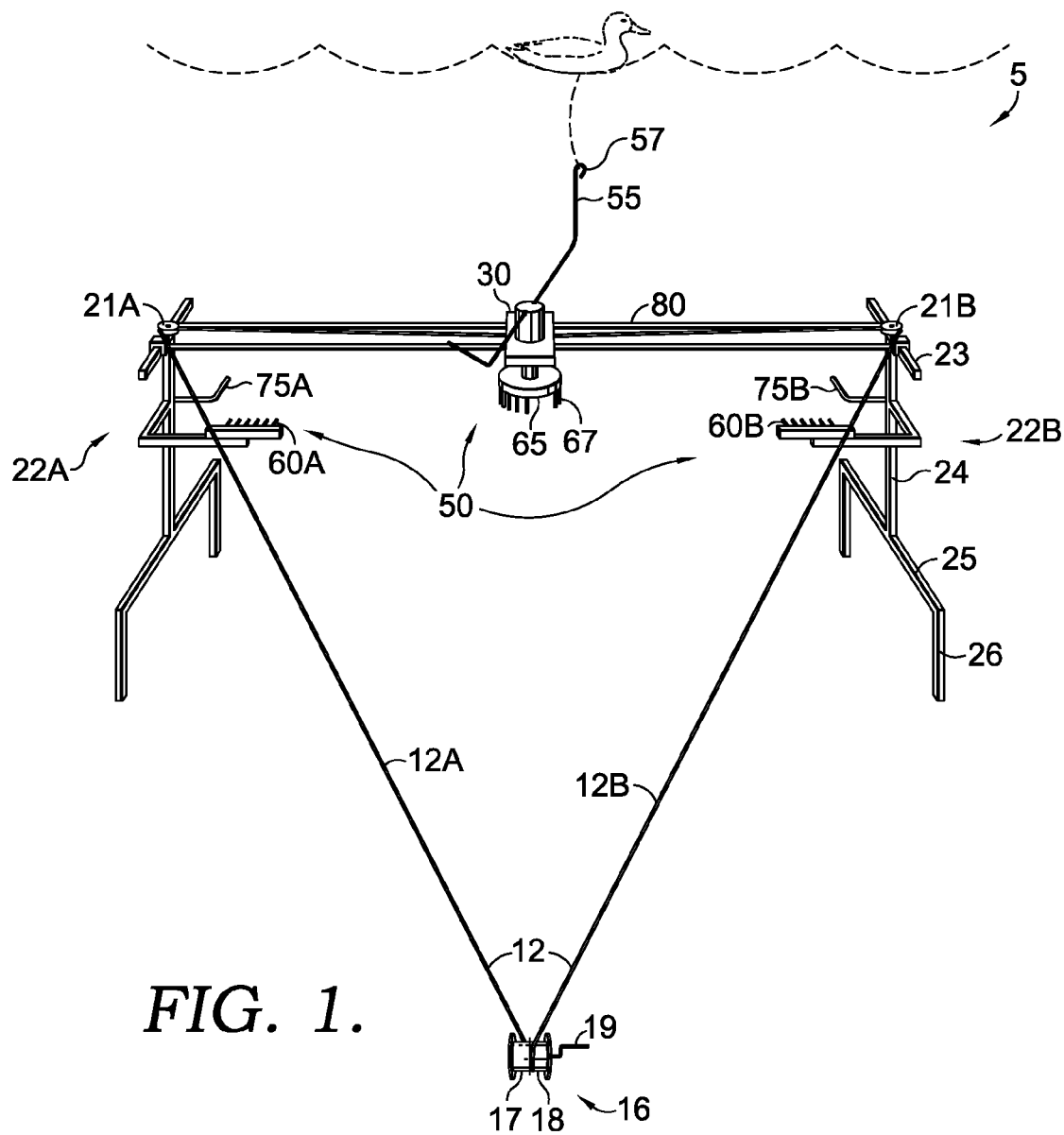
FIG. 1 is an elevated perspective view of an assembly for moving decoys in an embodiment of the invention.

The present invention will now be described in more detail through reference to the various figures. As shown in FIG. 1, an assembly for moving decoys of the present invention is generally identified by the numeral 5. The assembly 5 can be used to move one or more decoys in an ovular or semi-ovular pattern above a surface of a body of water. For example, the decoys may be duck decoys floating on the surface of the body of water.

In one embodiment the assembly includes two or more posts 22 that are securable to the floor of a body of water. In FIG. 1, posts are identified as 22A and 22B. As shown in FIGS. 1, 2a, and 2b, the posts 22 may include a center post 24 to which other components are attached. The posts 22 may be constructed of any rigid material. In an embodiment the posts are square steel tubing. A bottom portion of the posts 22 includes stakes 26. For example, the stakes 26 may connect to a bottom crossbar 25, which is coupled to the center post 24. The bottom crossbar 25 may also be constructed of square steel tubing and may be welded to the center post 24. In one embodiment, the stakes 26 are constructed of steel tubing that is welded to the bottom crossbar 25. In an alternative embodiment, the stakes 26 comprise rods, such as drill rod and the bottom crossbar 25 includes one or more holes for securely receiving an end of a stake 26 that is welded to the bottom crossbar 25. Stakes 26 function to anchor the posts 22 into the floor of a body of water.

The center post 24 may be constructed of multiple segments (not shown) coupled in a variety of ways. For example, two or more segments may overlap and be hingedly coupled, such as by a bolt or pin which functions as an axis. In such an embodiment, the segments may include alignable holes in the portions that overlap through which a stop pin may be inserted to prevent the portions from rotating on the axis (bolt). In addition, segments may be telescopically attached such that one segment has a smaller cross section than another segment, the smaller segment slidable inside the cross-section of the larger segment. Where telescopically attached, the segments include alignable holes through which pins may be inserted and removed to adjust the length of the center post 24.

As shown in FIG. 1, post 22A and post 22B are connected to each other by one or more slide rails 80. In the various figures, the assembly includes two round slide rails 80; however, it should be appreciated that the assembly could include a number of slide rails of various cross-sectional shapes. For example, the assembly could include one flat slide rail or three or more slide rails. The slide rails 80 connect at the top of each post 22A/B. As shown best in FIG. 2, posts 22A/B may include a top crossbar 23 with one or more holes for receiving an end of a slide rail 80. Alternatively, the assembly may include one or more mounting clips 81 with a hole for receiving an end of a slide rail 80. As shown in FIG. 2a and FIG. 2b, the mounting clip 81 is shaped to frictionally fit onto the top crossbar 23. The top crossbar 23 may be constructed of square steel tubing welded to the center post 24.

As shown best in FIGS. 2a/b, the assembly includes a rotation initiation bar 75 coupled to the center post 24 of each post 22 below the one or more slide rails 80. The rotation initiation bar 75 may be coupled to the center post 24 by a variety methods. For example, the rotation initiation bar 75A/B may be welded to the center post 24 or securely received by a hole in the center post 24 or a combination thereof. In one embodiment, as shown in FIG. 1, each post 22A/B includes a rotation initiation bar 75A/B. As shown in FIG. 1, the rotation initiation bars 75A/B are coupled across from each other on a same side of the assembly. As will be further explained below, the rotation initiation bars 75A/B function to engage a rotatably-mounted gear 65 coupled to a decoy carrier 32, which is slidably mounted to the one or more slide rails 80.

As shown best in FIG. 2a, the assembly includes a timing pin mounting arm 28 for attaching timing pins 60 to each post 22 below the one or more slide rails 80. The timing pin mounting arm 28 may be any rigid material, and in one embodiment, comprises square steel tubing welded to the center post 24. In one embodiment, the assembly includes a timing pin base 90 for supporting the timing pins 60 in a fixed position. The timing pin base 90 comprises a rigid block having holes for securely receiving timing pins 60. The timing pin base 90 is coupled to the timing pin mounting arm 28. In one embodiment, bolts couple the timing pin base 90 to the timing pin mounting arm 28. In one embodiment, the assembly includes six (6) timing pins aligned in the timing pin base 90. In addition, as shown in FIG. 1, the set of timing pins 60A coupled to post 22A is on the same side of the assembly as the set of timing pins 60B on post 22B. As will be further explained hereinafter below, the timing pins 60A/B are precisely sized and spaced apart from one another at a distance that will enable the timing pins 60A/B to engage the rotatably-mounted gear 65 coupled to the decoy carrier 32, which is slidably-mounted to the one or more slide rails 80.

As shown best in FIG. 2a, one or more posts 22 of the assembly may also include a pulley 21 coupled to the top of the post 22. For example, the pulley 21 may be coupled to the top crossbar 23 of the post 22. In an alternative embodiment the pulley 21 may be attached to a pulley mounting arm, which is attached to the post 22. The pulley 21 serves to change a direction of force applied on a pull line 12 connected to the decoy carrier 32 (best shown in FIG. 3). Furthermore, the pulley 21 (and pulleys 21A/B in FIG. 1) may include a guide, cover, or an eye (not shown) to prevent a pull line 12 from becoming disengaged from the pulley track.

As shown best in FIG. 3 (and briefly mentioned hereinabove), an assembly of the present invention includes a decoy carrier 32. The decoy carrier 32 is slidably-mounted to the one or more slide rails 80. For example, the decoy carrier 32 may include holes extending horizontally from one side of the decoy carrier 32 to an opposing side of the decoy carrier 32. A slide rail 80 may be inserted through a hole of the decoy carrier 32 to slidably-mount the decoy carrier 32 to the slide rail 80.

The decoy carrier 32 includes other components of the assembly coupled thereto. The decoy carrier 32 includes a rotatably-mounted gear 65 (mentioned previously herein) coupled beneath the decoy carrier 32. The rotatably-mounted gear 65 may be coupled beneath the decoy carrier 32 by a variety of methods. Generally, the decoy carrier 32 includes a hole extending vertically from a top surface of the decoy carrier 32 to a bottom surface of the decoy carrier 32. The rotatably-mounted gear 65 may be attached (through the hole) to components above the decoy carrier 32. In one embodiment a rotatable shaft (not shown) coupled to an attachment block 53 above the decoy carrier 32 extends through the hole and is securely coupled to the rotatably-mounted gear 65. In such an embodiment, the rotatably-mounted gear 65 and attachment block 53 are coupled to the same shaft and are rotatably coupled to the decoy carrier 32 such that rotation of the rotatably-mounted gear 65 will rotate the shaft and the attachment block 53. The rotatably-mounted gear 65 includes gear pins 67 secured thereto. In one embodiment, the gear pins 67 are rods securely received in holes in a bottom of the rotatably-mounted gear 65. The gear pins 67 are for engaging the rotation initiation bar 75 and timing pins 60 attached to each post 22 (both previously described hereinabove).

Figure 3:
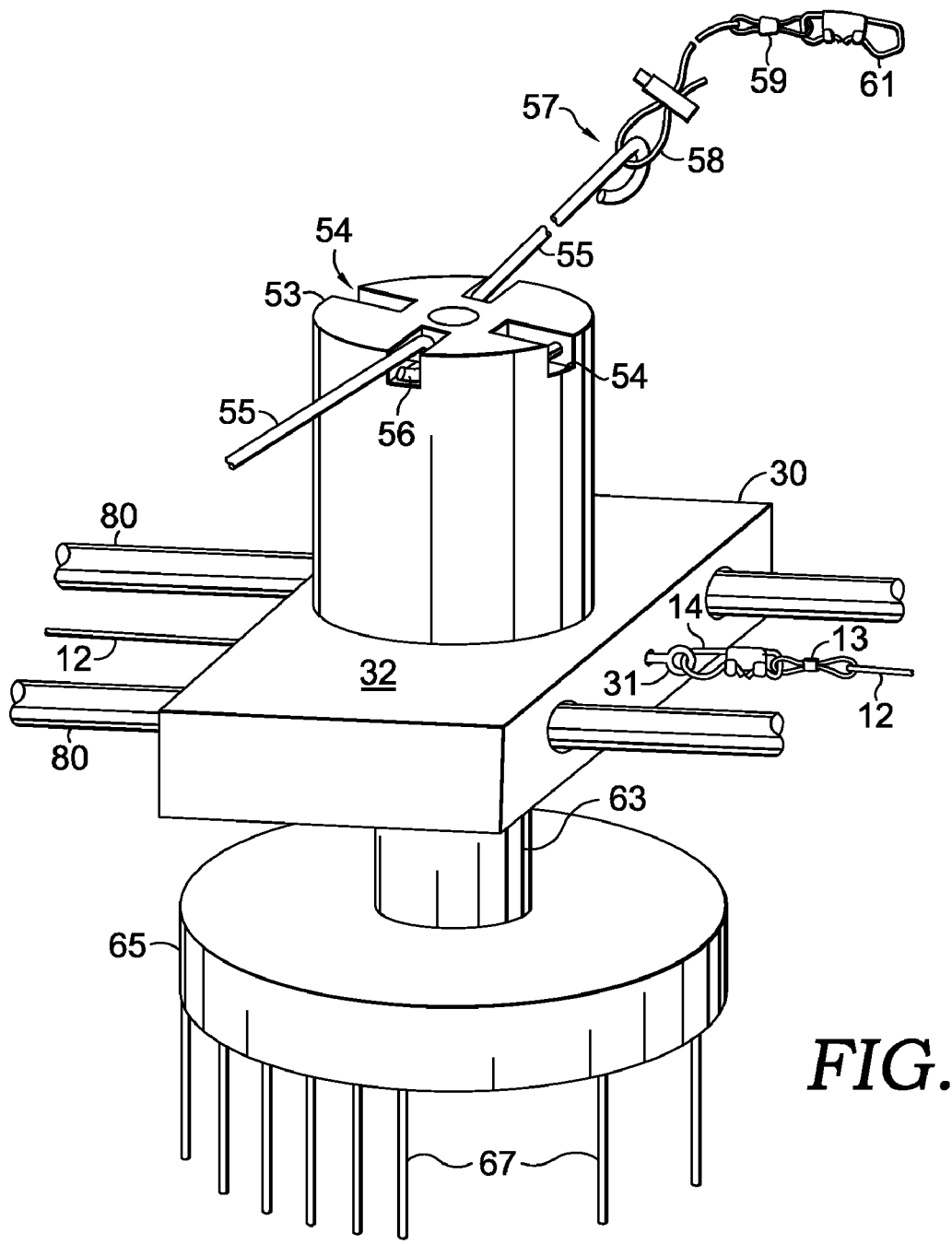
FIG. 3 is a perspective view of a decoy carrier in an embodiment of the invention.

As best shown in FIG. 3, the assembly includes decoy attachment arms 55. The decoy attachment arms 55 are pivotally coupled at one end to the attachment block 53. A decoy attachment arm 55 extends from the attachment block 53 to couple a decoy to the assembly. For example, in FIG. 3, the attachment arms 55 include a loop 56 formed in one end of the attachment arm 55. The loop 56 is fixed about an axis in a receiving slot 54 of the attachment block 53. The attachment arms 55 also include another loop 57 at an opposing terminal end to loop 56. Loop 57 connects to a line 58 that includes a swivel 59 at one end. The swivel 59 includes a clasp 61 for attachment to an underneath side of a decoy. When operating the assembly, clasp 61 may be attached to a decoy floating on a water surface. Because the decoy attachment arms 55 are pivotally coupled to the attachment block 53, the decoy attachment arms 55 may pivot up or down to adjust to the depth of water in which the assembly is operated. In addition, the length of line 58 may be adjusted to operate the assembly in water of varying depth. For example, line 58 may include a spring-loaded lock device to adjust the length of line 58.

In another embodiment of the invention, the attachment block 53, or a portion thereof, is removable from the decoy carrier 32. For example, in an embodiment the attachment block 53 includes a bottom block that is coupled to the rotatably-mounted gear 65, such as by a shaft. In addition, the attachment block 53 includes a top block to which the decoy attachment arms 55 are pivotally coupled, the top block being removably secured to the bottom block. For example, the bottom block may include one or more holes in a top surface that align with, and have the same cross section as, one or more holes in a bottom surface of the top block. One or more rods with the same cross-section as the alignable holes may be first inserted into the bottom block. Then the top block may be secured to the bottom block by arranging the top block on top of the bottom block with the one or more rods inserted into the holes of the top block. Alternatively, the entire attachment block 53 may be removably secured to the shaft. For example, the shaft and the attachment block 53 may include alignable holes through which a pin may be inserted.

As briefly mentioned hereinabove, the assembly includes pull lines 12 coupled to the decoy carrier 32. Pull lines 12 are flexible and can include a variety of materials, such as but not limited to, rope, wire, fishing line, cable, twine, cord, braided nylon, string, and thread. In one embodiment, as shown in FIG. 3, the pull lines 12 are tied to a swivel 13. The swivel 13 is coupled to a clasp 14. The clasp 14 is coupled to an eye hook 31 secured in a side of the decoy carrier 32. As previously indicated, the pull lines 12 function to pull the decoy carrier 32 along the slide rails 60 between the posts 22. In an embodiment, the assembly includes two pull lines 12, each attached to an opposing side of the decoy carrier 32. The two pull lines 12 extend from the decoy carrier 32 towards the posts 22, each pull line 12 extending towards opposite posts 22.

In the embodiment, as illustrated in FIG. 1, both pull lines 12A/B are wrapped around an anchored rotatable reel 16. The anchored rotatable reel 16 is divided into a first side 17 and a second side 18, wherein the first side 17 and second side 18 rotate consistent with the same axis. The pull lines 12A/B are wrapped around opposite sides 17/18 and in opposite directions of the anchored rotatable reel 16. For example, pull line 12A may be wrapped clockwise around side 17 and pull line 12B may be wrapped counter-clockwise around side 18. Rotating the anchored rotatable reel 16 clockwise winds pull line 12B around side 17 and unwinds/releases slack in pull line 12A from side 18. In one embodiment, the anchored rotating reel 16 freely rotates about an anchored shaft. For example, a shaft may be coupled to a stake and anchored to a tree or anchored into the ground. The size of the rotatable reel 16 may be increased or decreased to adjust the amount of pull line wound or released per rotation.

In one embodiment, as shown in FIG. 1, the anchored rotating reel 16 may be oriented in a position out of alignment with both posts 22. In such an orientation, the pull line 12A may extend from the decoy carrier 32 and wrap around pulley 21A and pull line 12B may extend from the decoy carrier 32 and wrap around pulley 21B. Accordingly, when pull line 12A is being wound by cranking the anchored rotating reel 16, pull line 12A will draw the decoy carrier 32 towards the post 22A on which pulley 21A is coupled. To change the direction of the decoy carrier 32, the anchored rotating reel 16 is cranked in the opposite direction to wind pull line 12B, which will draw the decoy carrier 32 towards post 22B on which pulley 21B is coupled.

In an alternative embodiment, the anchored rotating reel 16 may be aligned with both posts 22A/B. For example, post 22A may be in between the anchored rotating reel 16 and post 22B, wherein the anchored rotating reel 16 and both posts 22A/B are in the same line. In such an embodiment, pull line 12B would extend around pulley 22B before winding around the anchored rotating reel 16; however, pull line 12A would not need to extend around pulley 22A. Instead, pull line 12A would extend directly to the anchored rotating reel 16. In addition, where the reel 16 is aligned with posts 22A/B, the reel 16 and pulleys 21 may have a larger diameter than the attachment block.

In a further embodiment (as shown in FIG. 2b), wherein the reel 16 and posts 22A/B are aligned, the rotatable reel 16 is anchored to one of the posts 22. For example, an axle of the anchored rotatable reel 16 may be coupled to the post 22. In one embodiment, the axle is coupled to a rotating motor 100 attached to center post 24. In such an embodiment, the motor includes a receiver and may be remotely controlled by a transmitting device to change the direction of the motor's rotation. For example, a remotely controlled rotating motor 100 may be attached to the center post 24. An axle may be coupled to the rotating motor 100 such that the axle may be turned clockwise or counter-clockwise by the motor. The axle 102 may be coupled such that it extends vertically. Where the axle extends vertically, the anchored rotatable reel 16 may be anchored to the axle such that side 17 is arranged on top of side 18. In such an embodiment, the anchored rotating reel is not freely rotational about the axle, but instead rotates in conjunction with the axle. Furthermore, pull line 12A may be wound around side 17 of the reel 16 and coupled to the decoy carrier. Pull line 12B may be wound around side 18 of the reel 16 and may extend around pulley 22B before being coupled to the decoy carrier 32.

In one embodiment, the assembly is set up and operated through a series of steps. Where the anchored rotatable reel 16 is manually cranked, the following steps may be practiced. An operator secures both posts 22A/B into the floor of a body of water, such that the posts 22A/B are submerged beneath the water surface. Exact height below the water surface does not have to be determined as the attachment arms 55 rotatably adjust when coupled to decoys floating on the water surface.

In addition, the line 58 may also be adjusted. An operator selects a position from which he or she desires to control the movement of the assembly by cranking the reel 16. Pull lines 12A/B are then adjusted such that the pull lines 12A/B are taut when both are connected to the decoy carrier 32 and wrapped around the reel 16. Where the position of control is not in alignment with the two posts 22A/B, the pull lines 12A/B may be extended around the pulleys 22A/B and attached to the decoy carrier 32. Where the position of control is in alignment with the two posts, one of the pull lines 12A/B is extended around one of the pulleys 22A/B and then coupled to the decoy carrier 32; while the other pull line 12A/B is coupled directly to the decoy carrier. The reel 16 is anchored.

Through previously-described embodiments, the decoy carrier 32 can be pulled in either direction along the slide rail, such as by turning reel 16. Referring to FIG. 1, operating the assembly includes pulling the decoy carrier towards a post 22A/B. Where the attachment arms 55 are attached to decoys floating on water, pulling the decoy carrier 32 towards a post 22A/B also pulls attached decoys along the water surface, thereby giving the decoys the appearance of swimming. Where the decoy carrier 32 is pulled towards post 22A, the gear pins 67 are aligned to engage the rotation initiation bar 75A. When the gear pins 67 come into contact with the rotation initiation bar 75A, the rotation initiation bar 75A causes the rotatably-mounted gear 65 to turn clockwise (when looking down from above the gear 65), which in turn rotates the attachment block 53 and decoy attachment arms 55. Decoys attached to the attachment arms 55 will also change direction in a clockwise motion, thereby giving the appearance that the decoys are changing direction while swimming. As the rotatably-mounted gear 65 is rotated by the rotation initiation bar 75A, the gear pins 67 are becoming aligned to engage with timing pins 60A. In addition, after turning the rotatably-mounted gear 65 the rotation initiation bar 75A prevents the decoy carrier from being pulled closer to post 22A, which in-turn prevents the rotatable reel 16 from winding any more of line 12A. At such time that reel 16 meets this resistance in winding line 12A, the rotatable reel 16 is cranked in the opposite direction, thereby pulling on and winding line 12B and pulling the decoy carrier towards post 22B. As the decoy carrier 32 is pulled towards post 22B, the gear pins 67 engage with the timing pins 60A to turn the rotatably-mounted gear 65 further clockwise, which in-turn rotates the attachment arms 55 and attached decoys. When the rotatably-mounted gear 65 moves past the timing pins 60A towards post 22B, the gear pins 67 are turned to a position ready to engage with rotation initiation bar 75B. After the gear pins 67 engage rotation initiation bar 75B, the above-described steps are repeated.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. An assembly for moving one or more decoys above a floor of a body of water, the assembly comprising:
    two posts securable to the floor, the two posts connected to one another by one or more slide rails, wherein the two posts each comprise a rotation initiation bar and timing pins coupled below the one or more slide rails and wherein at least one post comprises a pulley;
    a decoy carrier slidably coupled to the one or more slide rails, the decoy carrier comprising:
        (1) a rotatably-mounted gear coupled below the decoy carrier, wherein the rotatably-mounted gear is oriented to engage the rotation initiation bar and timing pins on each post and
        (2) coupled above the decoy carrier to the rotatably-mounted gear, one or more decoy attachment arms for attachment to the one or more decoys;
    pull lines connected to the decoy carrier and wrapped around a rotatable reel, wherein the pull lines are wrapped around opposite directions of the rotatable reel such that rotating the reel clockwise winds a first pull line and unwinds a second pull line, and wherein at least one of the pull lines extends around the pulley such that clockwise rotation of the reel slides the decoy carrier connected to the pull lines in a first direction along the one or more slide rails and counter-clockwise rotation slides the decoy carrier connected to the pull lines in a second direction along the one or more slide rails.

2. The assembly of claim 1 wherein each post comprises one or more stakes for securing the stake into the floor.

3. The assembly of claim 1 wherein each post comprises a top crossbar and wherein the two posts are connected to one another by two slide rails, the two slide rails connected to the top crossbar of each post.

4. The assembly of claim 1 wherein each post comprises a center post and wherein the rotation initiation bar and timing pins are coupled to the center post.

5. The assembly of claim 1 wherein the decoy carrier comprises one or more holes extending from one side of the decoy carrier to an opposing side of the decoy carrier and wherein at least one of the one more slide rails extends through one of the one or more holes.

6. The assembly of claim 1 further comprising an attachment block coupled above the decoy carrier, wherein the attachment block and the rotatably-mounted gear are coupled to each other through the decoy carrier and wherein the one or more decoy attachment arms are coupled to the attachment block.

7. The assembly of claim 1 wherein the rotatably-mounted gear comprises gear pins for engaging the rotation initiation bars and timing pins.

8. The assembly of claim 1 wherein:
    each post comprises a pulley attached to the top of the post;
    the first pull line is connected at a terminal end to a side of the decoy carrier and the second pull line is connected at a terminal end to an opposing side of the decoy carrier; and
    the first pull line extends around a first pulley and attaches at an opposing terminal end to the rotatable reel and the second pull line extends around a second pulley and attaches at an opposing terminal end to the rotatable reel.

9. The assembly of claim 1 wherein:
    the first pull line is connected at a terminal end to a side of the decoy carrier and the second pull line is connected at a terminal end to an opposing side of the decoy carrier; and
    the first pull line attaches at an opposing terminal end to the rotatable reel and the second pull line extends around the pulley and attaches at an opposing terminal end to the rotatable reel.

10. The assembly of claim 9 further comprising a motor attached to one of the posts, wherein the motor rotates an axle coupled to the motor and wherein the rotatable reel is connected to the axle.

11. An assembly for moving one or more decoys above a floor of a body of water, the assembly comprising:
    two posts securable to the floor, the two posts connected to one another by one or more slide rails, wherein the two posts each comprise a rotation initiation bar and timing pins coupled below the one or more slide rails and wherein one post comprises a pulley and the opposing post comprises a reel coupled to a motor;
    a decoy carrier slidably coupled to the one or more slide rails, the decoy carrier comprising:
        (1) a rotatably-mounted gear coupled below the decoy carrier, wherein the rotatably-mounted gear is oriented to engage the rotation initiation bar and timing pins on each post and
        (2) coupled above the decoy carrier to the rotatably-mounted gear, one or more decoy attachment arms for attachment to the one or more decoys;
    a first pull line and a second pull line connected to the decoy carrier, wherein the first pull line attaches to the reel and the second pull line extends around the pulley and attaches to the reel, wherein the pull lines are wrapped around opposite directions of the reel such that rotating the reel clockwise winds one pull line and unwinds the other pull line, and wherein clockwise rotation of the reel slides the decoy carrier connected to the first and second pull lines in a first direction along the one or more slide rails and counter-clockwise rotation of the reel slides the decoy carrier connected to first and second pull lines in a second direction along the one or more slide rails.

12. The assembly of claim 11 wherein the motor is coupled to a center post and the motor comprises an axle, the axle for attachment to the reel.

13. The assembly of claim 11 wherein the motor is remotely controlled.

14. An assembly for moving one or more decoys above a floor of a body of water, the assembly comprising:
    two posts securable to the floor, the two posts connected to one another by one or more slide rails, wherein the two posts each comprise a rotation initiation bar and timing pins coupled below the one or more slide rails and wherein each one post comprises a pulley coupled thereto;
    a decoy carrier slidably coupled to the one or more slide rails, the decoy carrier comprising:
        (1) a rotatably-mounted gear coupled below the decoy carrier, wherein the rotatably-mounted gear is oriented to engage the rotation initiation bar and timing pins on each post and
        (2) coupled above the decoy carrier to the rotatably-mounted gear, one or more decoy attachment arms for attachment to the one or more decoys;
    a first pull line and a second pull line connected to the decoy carrier, wherein the first pull line extends around a first pulley and attaches at a terminal end to a rotatable reel and the second pull line extends around a second pulley and attaches at a terminal end to the rotatable reel, wherein the pull lines are wrapped around opposite directions of the rotatable reel such that rotating the reel clockwise winds a first pull line and unwinds a second pull line, and wherein clockwise rotation of the reel slides the decoy carrier connected to the pull lines in a first direction along the one or more slide rails and counter-clockwise rotation slides the decoy carrier connected to the pull lines in a second direction along the one or more slide rails.

15. The assembly of claim 14 wherein the reel is rotatably coupled about an axis and wherein the axis is attachable in a fixed location.

16. The assembly of claim 15 wherein the axis includes a stake for attachment in a fixed location.

* * * * *